C. E. FRITTS, DEC'D.
J. H. FRITTS, ADMINISTRATRIX.
APPARATUS FOR MAKING SOUND RECORDS.
APPLICATION FILED JUNE 22, 1912.
1,213,615. Patented Jan. 23, 1917.
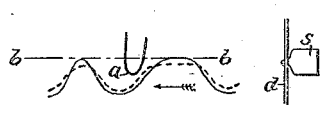
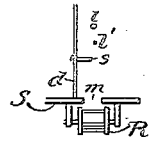
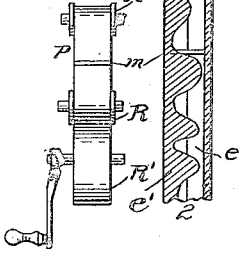
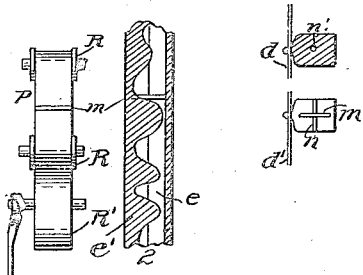
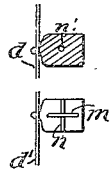
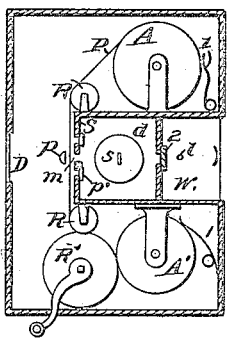
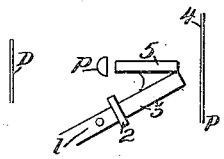
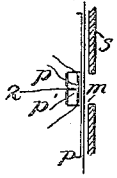

C. E. FRITTS, DEC'D.
J. H. FRITTS, ADMINISTRATRIX.
APPARATUS FOR MAKING SOUND RECORDS.
APPLICATION FILED JUNE 22, 1912.
1,213,615.
Patented Jan. 23, 1917.
3 SHEETS—SHEET 2.
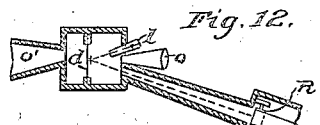
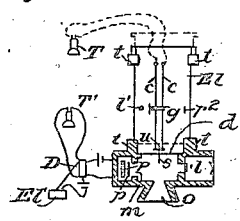
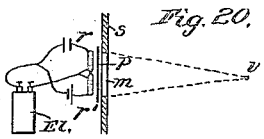
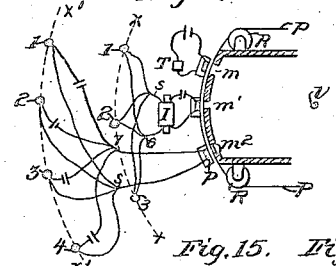
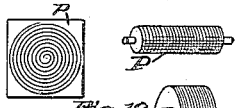
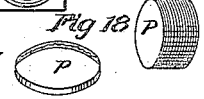
WITNESSES:

C. E. FRITTS, DEC'D.
J. H. FRITTS, ADMINISTRATRIX.
APPARATUS FOR MAKING SOUND RECORDS.
APPLICATION FILED JUNE 22, 1912.
1,213,615.
Patented Jan. 23, 1917.
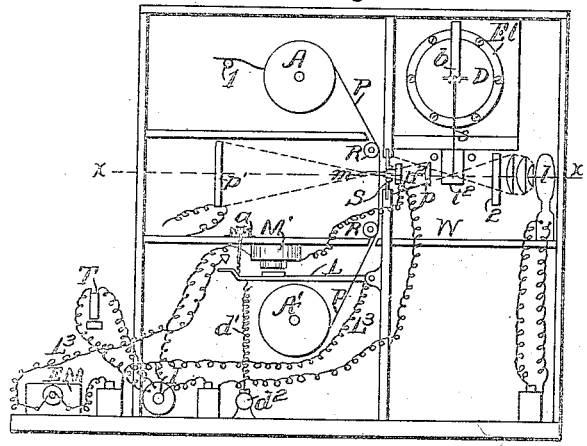
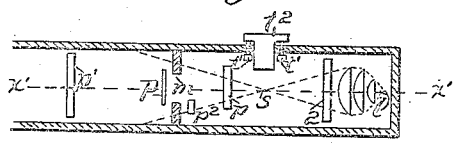
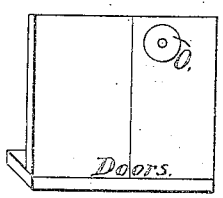

UNITED STATES PATENT OFFICE.

CHARLES EDGAR FRITTS, DECEASED, LATE OF ONEONTA, NEW YORK, BY JOSEPHINE H. FRITTS, ADMINISTRATRIX, OF ONEONTA, NEW YORK, ASSIGNOR, BY MESNE ASSIGNMENTS, TO JOHN D. MYERS, OF PHILADELPHIA, PENNSYLVANIA.

APPARATUS FOR MAKING SOUND-RECORDS.

1,213,615.      Specification of Letters Patent.      Patented Jan. 23, 1917.

Original application filed October 22, 1880, Serial No. 19,313. Divided and this application filed June 22, 1912. Serial No. 705,349.

*To all whom it may concern:*

Be it known that CHARLES EDGAR FRITTS, now deceased, but formerly a citizen of the United States residing at Oneonta, in the county of Otsego and State of New York, did invent a new and useful Improvement in Apparatus for Making Sound-Records, of which the following is a specification.

This invention relates to recording variations or pulsations in sounds, light or electric currents in a permanent or tangible form and reproducing the same at will not merely at the instrument alone, but also at any other instrument suitably connected therewith.

The present application is a division of the original application, Serial No. 19,313, filed October 22, 1880, and relates to one of the forms of record shown and described in said original application.

The present invention includes the application of photography and electricity for recording and reproducing the variations or pulsations above mentioned by the aid of a diaphragm or equivalent device capable of vibrating under those influences, and particularly under the influence of sounds as hereinafter fully set forth. For convenience of description the apparatus disclosed will be called a phonograph, but it is to be expressly understood that it is not the intention to limit the scope of the invention to what is commonly known as or done by the so-called phonographs or to narrow or restrict the scope of the invention in any way, but the term is used merely for convenience.

The novel features of the invention will be apparent from the following description taken in connection with the accompanying drawings.

In the drawings, Figure 1 is a diagrammatic view illustrating the defective result of attempting to produce a phonograph record by indenting the blank. Fig. 2 is an edge view of a speaking diaphragm having a shutter mounted thereon such as may be used in carrying out the invention. Fig. 3 is a view partly broken away showing a speaking diaphragm carrying a shutter, a source of light and a roller carrying a sensitive strip exposed to said light through an opening controlled by said shutter. Fig. 4 shows at the left a plan view of the sensitive strip and rollers and at right an enlarged plan view of a portion of the strip having the photographic record thereon. Fig. 5 shows two forms of shutter mounted on diaphragms which may be used in carrying out the present invention. Fig. 6 is a plan view of a strip having thereon a sinuous record produced by the shutter shown in Fig. 5. Fig. 7 is a vertical sectional view of one form of apparatus arranged for making the negative or pattern and moving it along by hand in carrying out the invention. Fig. 8 is a diagrammatic view showing means for reproducing and utilizing an opaque record by reflected light. Fig. 9 shows an electric circuit having a selenium bar therein adapted to be affected by light from the record. Fig. 10 is a similar view showing a flat selenium cell with a lens for concentrating the light from the record on it. Fig. 11 shows two selenium cells arranged for exposure through a single opening to produce alternating current. Fig. 12 is a sectional view of an apparatus having a mirror on the speaking diaphragm for reflecting light to the record surface. Fig. 13 is a sectional view of an apparatus which may be used either for making or utilizing the record. Fig. 14 is a view in detail of a plurality of means for utilizing a single record. Fig. 15 is a plan view of a disk record having the photographic impressions thereon in a spiral. Fig. 16 is a perspective view of a cylinder having a spiral record thereon. Fig. 17 is another form of record having thereon a single circular pattern. Fig. 18 is still another form showing separate parallel patterns. Fig. 19 is a sectional view of an apparatus for taking and reproducing the record having a lens for concentrating the light upon the strip. Fig. 20 is similar to Fig. 11 showing the electrical connections more clearly. Fig. 21 is a general view of the apparatus disclosed in Fig. 7 but more in detail showing more clearly the arrangement and connection of the parts. Fig. 22 is a horizontal section on the line *x—x*. Fig. 21. Fig. 23 is a perspective view of the doors for the apparatus shown in Fig. 21.

The great trouble with phonographs heretofore is that they have undertaken to record and reproduce delicate air pulsations by crude and clumsy mechanical means. In the operation of the methods heretofore used the metal point used for indenting the record is hindered in its vibrations by the labor of impressing its motion in the foil or other material used in its place. This resistance not only retards the diaphragm itself, but it retards it in a very variable manner. When the tracer point reaches a soft, thin or unsupported spot in the foil it moves farther than the average, while thick or hard spots, reduce the motion below the average. A score of other faults could be mentioned, but the most important is that when the point is descending, the pressure of the foil against its inclined forward surface retards the motion of the diaphragm; but when ascending, it hastens or assists it, thus deforming the vibrations of the diaphragm itself. This will be understood by examining Fig. 1, where *a* is the tracer point, with its front surface inclined backward to prevent clogging. The dotted line *b b* represents the original level of the foil, which is fed along in the direction of the arrow, and the solid curved line shows the actual form of a supposed sound wave, while the dotted curve shows the form which the point will tend to make,—and this discrepancy will be aggravated by the stiffness of the foil, the weakness of the vibration or the spring of the tracer, and many other causes.

The present invention is designed as one means for obviating the difficulties above described and this is accomplished by dispensing entirely with the tracer and its spring and the foil or any substitute for it, or any mechanical pressure devices whatever, for recording the sound waves tangibly. The present invention employs means for recording the vibrations of the diaphragm which neither retard nor accelerate them, but will truly record the most extreme or violent, or the gentlest pulsations, and every one exactly as it occurred. This is done by causing the diaphragm as it vibrates to vary a light which passes through an aperture to a surface sensitive to light by which the sound waves are fixed and recorded. No matter how many or how different the sounds which are joined in producing the composite sound waves which strike the diaphragm, the true number and intensity of every one of them will thus be preserved unchanged by the process of recording. This record is called the negative and from it can be produced copies or duplicates in the same or other materials and they can be used for the reproduction of the sounds recorded thereon.

The record of sound after it is produced as above described is utilized to operate a speaking diaphragm by throwing upon it light which has been varied correspondingly with the form of the sound waves recorded as before described which, as is known, causes the diaphragm to vibrate and produce the sounds corresponding to those waves. To accomplish this a powerful beam of light is passed through the negative previously prepared to and upon the diaphragm. This light passes through a narrow slit corresponding to the one used in making the negative, and by moving the negative along behind this slit at the same speed as when making the negative, it is evident that the original variations in the intensity of the light are exactly reproduced, and if they are thrown upon the diaphragm it will give out the same sound as that which originally caused it to vibrate. Thus, instead of trying to shove the diaphragm back and forth by machinery some hundreds or thousands of times per second, at a constantly varying speed, and making each motion exactly according to a prescribed pattern, each one of which may be different from any of the others, the same end in the present invention is accomplished by the slow motion of a single piece or negative, and causing that to control the action of a beam of light directed upon the diaphragm.

Instead of the light beam passing through a transparent negative, it may be thrown upon an opaque negative and the image of the pattern be reflected therefrom and utilized, or the intensity of the light thrown upon the diaphragm may be automatically varied by the negative in many other ways.

In making the negatives, the sound to be recorded is caused to impinge upon a vibrating diaphragm, which is properly damped and arranged, as will be readily understood by those versed in telephony. To the center of the diaphragm *d*, Fig. 2, is fixed a vertical screen or shutter *s* of mica or other light and stiff material, secured at the center of its edge to the diaphragm, and its inner corners being rounded off a little to prevent their contact with the diaphragm during its backward vibrations, or to the left. It projects out at right angles to the plane of the diaphragm, and in this particular form is made opaque to prevent the passage of any light through it. Fig. 3 is a vertical plan view; *s* is the shutter, *d* the diaphragm, *l* is a powerful light throwing a beam of nearly parallel rays across to the screen or partition S, which has a long, narrow slit *m* in it, through which the light passes and strikes the prepared surface, which in this case is represented as a strip of sensitized paper, fed at a regular speed over the rollers R, R. As the diaphragm shutter *s* in this form normally stands, its edges shut the light off from one-half of the slit, and in vibrating it covers up more or less of the strip, according to the extent of the vibrations. The paper strip being carried along behind the slit *m*, Fig. 4, the edge of the shutter will describe a curved line at the junction of the part $e^1$, not acted upon by the light, and $e$, which is acted upon, and by proper treatment the latter may be dissolved away or otherwise made transparent, in any well known way, as will at once be understood by photographers.

By varying the relative distances of the light, the shutter, and the slit or sensitive surface from each other, the apparent amplitude of the sound waves as recorded on the sensitive surface, can be increased without changing their forms. In Fig. 3, two positions of the light are shown marked $l$ and $l'$. This method of amplifying the vibrations is often important, and can be applied for strengthening pulsations or variations in light or electrical currents, as well as in sounds.

If, instead of an opaque shutter on the diaphragm, we leave a vertical transparent strip across said shutter, the light will reach the paper strip behind the screen only through the intersection of the two slits in front of it, forming merely a square spot of light, as shown by Fig. 5 at the intersection of the two slits $n$ and $m$. The vertical slit on the mica should make the light beam of about the same width as the stationary horizontal slit in the screen. As the diaphragm vibrates and the paper is moved along, we produce (after dissolving out the parts exposed to light, blacking the rest, soaking in oil or otherwise rendering it transparent), a narrow transparent curve on the paper strip, as represented in Fig. 6. Instead of the vertical strip, we may use a transparent spot, at the point which will fall on the center of the stationary slit when the diaphragm is still, as seen at $n'$ on the upper shutter shown in Fig. 5. This, also, makes a negative strip like Fig. 6.

These patterns or negatives, and others which can be made by the above described method, are suited for different uses. It is evident that when a correct negative is once obtained, perfect copies can be produced not only by photographic but also by ordinary printing processes, or even by mechanical means, at a merely nominal cost, even for the most elaborate negatives.

Having thus explained the principles of the present invention, Fig. 7 represents an apparatus which has been devised for carrying out the method. At A is a roll of the prepared negative strip, wound upon a bobbin, which is mounted in journal bearings in any convenient way. This strip may be of any suitable thin and flexible material, which may be strong fine paper, but what is known as paper parchment is preferred, although many other substances may be used. It should be covered with a thin film made very sensitive to light, by any of the instantaneous processes employed in photography, although a dry process will be most convenient with this form of negative. After being properly coated and sensitized, it should be carefully dried, rolled up, and protected from light or damp till ready to use it. It may be thus coated and sensitized either before or after being cut up into strips of width suitable for use, but in the latter case care must be taken in the cutting not to disturb the adhesion of the film to the strip. A suitable width is $\frac{1}{2}$ or $\frac{3}{4}$ inch, and the length will of course be governed by convenience, or the choice of the operator.

The roll A is free to turn, being held only by the spring 1, pressing upon it sufficiently to prevent it from turning faster than the strip is needed. From A, the strip passes over the flanged rollers R R, Figs. 3, 4 and 7; at $R^1$ is a rubber-faced roller which presses the paper strip between itself and R, tightly enough to prevent the slipping of the strip. It also fits between the flanges of the roller enough to carry that along with it. If desired, it can also press lightly on the roller $A^1$, to assist in rewinding the strip upon it. To this roller can be applied the power which feeds the strip along before the slit $m$ in the screen or partition S. For experiment, or common telegraphic purposes, a crank may be attached to the roller $R^1$ or R, as shown in Fig. 7, or the strip may be otherwise fed by hand. But when accuracy is required, some motor should be employed which will give the negative a perfectly uniform and known rate of speed. These are not new, and need not be described, as they form no part of my invention. The motor may be attached to or contained in the box or frame of the phonograph, or otherwise connected, as preferred.

The strip being thus fed along at a uniform speed, it is wound upon a second roller $A^1$, or may simply be fed loosely into the bottom of the box or case of the phonograph. It will now remain unchanged, if kept from light and damp, for days or even weeks,—or, on the other hand, it may be at once developed, intensified, fixed, or otherwise treated, to render the image permanent,—according to the process employed or the effect desired; all of which will be at once understood by those versed in photography, who will be enabled, from the foregoing description, to readily make a negative strip having the characteristics required, and will probably prefer the gelatin-bromid process. If the paper seems to have a greasy nature, it may before applying the bromid emulsion, be coated with a 4 per cent. solution of white of egg, to which sufficient chrome alum has been added to give it a slight bluish tinge. This will insure the film adhering perfectly, but it will seldom be required if a good quality of paper or parchment is used. These strips being fixed, they may be treated and used in different ways. The parts acted upon by light may be made transparent, and the rest blackened and rendered more opaque, and the strip used by transmitting light through it; or the strip may be left opaque, and used by reflected light,—in which case the parts acted upon by light should be made as white or brilliant, and those not yet acted upon as black and absorbent of light as possible, all of which can be done by any one out of many well known ways, and detailed directions are not necessary. For example, a strip to be used by transmitted light may have the dark parts blackened with carbon ink, flexible black varnish, or otherwise, and the light parts rendered transparent by dipping in castor oil thinned with absolute alcohol.

The finished strip being again wound upon the wheel or roller A and properly arranged in the phonograph, we can reproduce the original variations in the first beam of light, in another beam of light, by feeding the strip before the slit $m$ at the same speed as when making the negative, and throwing the beam of light through it as it passes the slit. To do this, the diaphragm $d$ with its shutter is removed,—the upright frame which holds it being arranged to slide on a foot-piece which fits in grooves, so that it may be slid into its place for use or moved back out of the way, as desired. The square chamber which contained the diaphragm is now empty or free, and allows the light $l$ to shine unobstructed across it, to and through the slit $m$, onto and through the strip which is rapidly fed before it, whereby the light which passes through the strip is varied in precisely the same manner as the original beam of light was varied by the shutter on the diaphragm $d$; i. e., the greater the proportion of the strip which is transparent, the longer the beam of light which is passed through it, and vice versa, (see Fig. 4). This light can now be used to produce corresponding variations or pulsations in sound, electric currents, magnetic attractions, etc., as desired.

This varying light can be converted into sounds in different ways. It may be passed through a plano-convex or rather plano-cylindrical lens $p$, or any suitable optical device, to widen and disperse it properly, and be thrown directly upon a thin, hard-rubber diaphragm D, properly arranged for speaking or giving out sounds. Or, in place of the lens $p$, a selenium bar or cell may be arranged to receive the light and thereby vary a current of electricity flowing through it, as shown at $p$ in Fig. 9, which current may then be conducted to a suitable telephone, which is substituted for the diaphragm D, and the sounds will be produced by it with any desired loudness. Or the current may be conducted by wire to any other instrument or place, in the same way as in telegraphy, and there converted into sounds or utilized for any other purpose, as in Fig. 13, where a current from D is represented as conveyed to a telephone T' at one place and to an electrical receiver of any suitable kind El' at another place.

When selenium is used for receiving the light and varying an electric current, it may be either in the shape of a bar $p$, covering the slit $m$, as shown in Figs. 9 and 13 or that of a flat cell $p^1$, in Fig. 10, where the light passing through the negative or pattern P and the slit $m$ is converged by the lens $p$ to a focus upon the selenium cell $p^1$, or for producing an intermittent current it may consist of two selenium cells or bars suitably arranged, as shown in Fig. 11, and described hereinafter. In either case, the electric current is arranged to flow through the selenium by proper conducting wires, and the varying quantity of light which falls upon the selenium will correspondingly vary the current flowing through it, as is well known to electricians. The two cells, Fig. 11, are arranged end to end with their approximating ends at the central line 2 of the pattern strip so that one cell or bar is opposite one-half of the slit $m$ and the other bar or cell opposite the other half. Each cell is arranged to send whatever current flows through it in a direction opposite to that of the current from the other cell, in any well-known or suitable manner and each may be supplied with its current from different ends or sections of the same battery or from separate batteries, as shown in Fig. 20, where the two sections of the selenium are inserted in derived circuits or branches of the main circuit. In either case, the electric current is arranged to flow through the selenium by proper conducting wires and the varying quantity of light which falls upon the selenium will correspondingly vary the current flowing through it, as is well known to electricians.

The negative may of course be taken on glass, instead of paper, and arranged to be properly moved before the slit and light. Any suitable material may be used, whether transparent or opaque, flexible or rigid, plane or curved. When the negative strip is required to be very narrow, in order to save room, instead of the light falling directly upon it, the varying light beam may be received upon a lens and converged to the desired size before being thrown upon the sensitive surface. The negative, in Fig. 7, would then be fed along at D, instead of between $p$ and $m$. Or, in Fig. 10, the negative would be at $p^1$.

When using an opaque strip or negative, the sound waves, or, rather, the variations of light produced by them, are recorded in the same way as already described. But, to reproduce those variations, the strip is fed along with the printed or formerly sensitive side outward, in the path of a beam of light, by which it is powerfully illuminated, and the light reflected from it is utilized instead of transmitted light. Fig. 8 shows the arrangement: $l$ is the light, which passes through the alum-water cell 2, through the tube 3, and illuminates the moving strip 4. 5 is a tube with blackened interior, each end having an aperture corresponding to the slit $m$, and so directly toward the strip that only the light from that part of the strip which would be covered by the slit $m$ can pass through both apertures,—all of which will be readily understood by photographers. This light is then received by the lens, or other suitable optical device, $p$, and properly thrown upon the diaphragm D, as before. Or the lens $p$ may be replaced by the selenium bar or cell, and the diaphragm D by one of the telephones, etc., exactly as before described for transmitted light. The distance of the illuminating arrangement from the negative strip is merely sufficient to thoroughly light up the field covered by the tube 5. Tubes 4 and 5 may be of any suitable size, length, and material, all of which may be left to the judgment of the operator, who should arrange the apparatus according to good photographic practice.

The pattern may be made upon a long narrow strip, as described, or arranged spirally over the surface of a plate as in Fig. 15 or a cylinder of any suitable size, shape, and material as in Fig. 16. By making it in a circular form, as in Figs. 17 and 18 and running it around, it will continue to repeat the same sound, word, or phrase, as long as it is turned.

Instead of the hard-rubber diaphragm D, one of celluloid may be used, also soft vulcanized rubber, thin elastic brass and German silver, and other materials. The diaphragm $d$ may be made of any of the materials used in telephony, which are suitable for the employment to be made of it in this process.

The light employed for making the negative should be strongly actinic, and may be direct sun light, or electric or other artificial light having sufficient actinic power for instantaneous photography. It should be arranged in a chamber W, preferably with a reflector or other means for making the rays nearly parallel. At 2, Fig. 7, they pass through a glass cell filled with alum water, to stop the heat without diminishing the light. They then pass through an aperture of suitable size, across the diaphragm chamber, where they are manipulated by the shutter $s$, and through the slit $m$, as already described. For using the negative, so strong a light will not always be needed, and a good kerosene lamp will answer for most ordinary purposes. Gas light is not suitable, unless a steady flame can be obtained, as a flickering light will interfere with the perfection of the speaking. For purposes requiring accuracy, however, a light should be used having ample actinic power, and the stronger the better. No harm can be done by having a light unnecessarily strong as it cannot be strong enough to do any harm.

The whole apparatus is inclosed in a close box or casing, as shown in Figs. 7, 12, and 13, to exclude external light, particularly from the negative. The light chamber W should be so tight that none of the light can penetrate the partitions around it, except through the cell 2. The diaphragm chamber is also inclosed on all sides except the one facing the sounds to be recorded, and the only opening on that side is through the bell or mouthpiece conducting the sound to the center of the diaphragm. All the interior surfaces are made densely black, in order to absorb and prevent the reflection of any light that may find its way inside. Suitable openings or doors are provided wherever necessary, for giving access to the different parts, which may be arranged to suit the convenience of the operator. This care about the light is required more especially while making the negative. For speaking purposes much less caution is needed.

Fig. 11 represents the arrangement for transmitting signals by the phonograph records above described, except that the strip or negative P is fed past the slit $m$ transversely, instead of lengthwise of it, as it would appear to be in the drawing. $m$ is the narrow slit, long enough to cover the length of the two selenium bars $p$ and $p^1$, each being inclosed and protected from all light except that which passes through the slit and the negative strip P. Each bar has proper wires to conduct the current through it, which are so connected up that each bar directs the current which flows in it through the line in an opposite direction, and their resistances are such that no current (or a very slight one) flows through either of them as long as they are kept in the dark. But immediately that the negative strip admits light to either bar, its resistance is lessened, and the current flows through that bar to the line, or to the primary coil of an inductorium which sends the induced current to line, or to any other devices, as the case may be,—the strength of the current being in proportion to the length of the bar thereby exposed to the light.

The electrical connections are more fully shown in Fig. 20 or they may be arranged in any other suitable or well known manner. The longer the transparent part of the strip or signal, the more of the bar is lighted up, and the stronger the current which flows through it. When the other bar is illuminated, the same effect is produced, but the current is sent through the line or circuit in the opposite direction,—all of which will be readily comprehended and effected by electricians.

Fig. 21 shows the general arrangement of the apparatus in more detail than Fig. 7.

When in use the works are shut in by tight doors, as in Fig. 23, where O is the mouth piece through which vocal or other sounds are thrown on the diaphragm D. This mouth piece may be a deep bell-shaped cavity directly over the diaphragm or be fitted to the face and be connected by a tube ending over the diaphragm. The effect is much increased by having the mouth piece fit closely to the face of the speaker.

In Fig. 21, means for automatically controlling the recording mechanism is shown, and it embodies a pivoted lever L carrying a catch to hold the roller A' against rotation. This lever is raised to release the roller by means of the magnet M' in circuit with the selenium $p^2$ and this lever has secured to it a spring $d'$ fastened to the casing $d^2$ tending to normally hold the lever down in engagement with the roller. A motor EM has circuit connections $L^3$ leading to opposite ends of lever L and the circuit through the lever is completed when it is raised. An induction coil I is also in circuit with the selenium and it includes the telephone T for reproducing the sound while it is being recorded on the strip P.

E$l$ represents an electrical apparatus capable of vibrating the diaphragm D when a telephonic, telegraphic or other suitable current is passed through it and thereby vibrating the shutter $s$ placed in the path of the beam of radiant rays from $l$ here shown as an electric lamp, and thus varying said beam in accordance with the extent and character of its own movements. The beam thus varied is in the first instance thrown upon the sensitized strip P fed down from reel A over guide roller R before the opening or slit $m$ on to another reel A'. The strip having been properly treated to bring out and fix the image thus obtained and render it suitable for use as a pattern, as before described, it is again wound upon reel A and its end hooked to reel A'. The apparatus E$l$ is moved back far enough to take shutter $s$ out of the beam of radiant rays which then pass through the negative and are varied thereby as they had been previously varied by the shutter $s$, after which they fall upon a selenium cell or other suitable apparatus $p'$, all as heretofore explained.

By suitably attaching the expansion wires of the telephone to the diaphragm $d$ of the phonograph instead of to its own diaphragm $d$, the phonograph will make negatives of the sounds or signals transmitted to it over the line in connection with the telephone. This arrangement is shown in Fig. 13. The telephone is designated by E$l$, the base of which slides in the cleats $t$ $t$ to the position shown by the dotted lines at its ends. $c$ $c$ are the suspension wires running to the cross piece $u$ which is attached to the diaphragm $d$ which is carried by the base of the telephone and, consequently, moves with the binding posts at the other ends of the wires $c$ $c$ when the diaphragm and shutter are to be moved back out of the way—thus avoiding any disarrangement of the telephonic adjustments thereby. T is the telephone telegraphic instrument or other apparatus which transmits sounds, electrical impulses, or signals from a distance to the telephonic devices E$l$ by means of which those influences are enabled to actuate the phonograph and produce records or "patterns" thereof as already described. The same apparatus E$l$, can, of course, be employed for transmitting messages, etc., as well as for receiving them. The phonograph can, therefore, remain in the office and the speech, music, or signals be transmitted to it by telephone for record and preservation. In this form as in others, light from $l$ passes across the shutter $s$ when that shutter is in the position shown in full lines and falls on the sensitized strip P. When the shutter $s$ is moved back out of the way and a developed strip is substituted for the sensitized strip P, the light passes through it to the selenium cell $p$ in circuit with the primary of a transformer D. The telephone T' and any other suitable sound reproducer E$l'$ are in circuit with the secondary.

In Fig. 14, the invention is shown with the parts arranged to reinforce the reproduced sound at various distances from the main apparatus. In this instance, the light $l$ is within a casing having a semi-cylindrical end in which are formed the slits $m$, $m'$ and $m^2$. The record strip P passes over the rollers R and across the slits $m$, $m'$ and $m^2$, whereby the light from $l$ passes through the slits to the selenium cells $p$ placed opposite them. The telephone or sound reproducer T is in circuit with the selenium cell at slit $m$. The current from the second cell at slit $m'$ passes through the primary wire of an induction coil I, the secondary of which sends an induced current through the several sound reproducing devices 1, 2 and 3 arranged in the arc of a circle with the main apparatus as the center, the characters $s$ and 6 indicating the circuit connections whereby the single current passes through each of the reproducers. A second set of reproducing devices 1, 2, 3 and 4 are shown arranged on the arc of a circle $x'$, $x'$, at a greater distance from the apparatus, the circuit connections being shown at *s* and 7. These series of reproducers on lines *x, x* and *x′, x′*, are for the purpose of reinforcing in a large hall, the sound coming from the reproducer T, the distance between the slits *m, m′*, and *m²*, and the speed of movement of strip P being so regulated that the sound from T will have traveled through the air to the line *x, x*, at the moment that the corresponding portion of the strip P reaches slit *m′* so as to operate the reproducers on the line *x, x*, at the same moment that the sound traveling through the air reaches that point.

In Fig. 19, the light from *l* after being varied by the shutter *s* carried by the diaphragm *d* passes through the slit *m*, and is converged by the lens *p* and then falls upon the negative P. Instead of falling on the negative P, a speaking diaphragm D may be substituted for it and the light will then fall on the diaphragm.

Fig. 22 is a horizontal section through the lines *x—x* of Fig. 21, showing the light and lenses *l*, alum cell 2, shutter *s*, cylindrical lens *p* which converges the light laterally to a long narrow streak where it passes through the opening *m* to strip P. The set-screws *i′ t′* adjust the forward position of the block *t²* on apparatus E*l* to bring the shutter *s* to the right point. *p²* is a small selenium cell which serves to automatically start off the strip P when the phenomenon occurs which is to be recorded. The shutter *s* is caused to vibrate, as already stated, and thereby uncovers the cell *p²*, allowing the light which had previously been stopped by the shutter to fall upon the cell and by increasing its conductivity an electric impulse is sent through the starting magnet M′. This immediately pulls up the armature and lever L and raises the pawl which had previously held the reel A′, whereupon the reel is suddenly revolved and draws the strip P past opening *m* until the sound or other phenomena ceases, when the shutter becomes still, the current substantially ceases to flow through the cell *p²* and magnet M′, the lever L drops and the reel A′ is stopped. When reproducing the recorded phenomena the lever L is lifted manually by a cord *a* running over a pulley through an aperture to the outside at some accessible point, where it can be pulled when desired. The current of the cell *p²* can also be sent through induction coil I and transmit the message if desired to a telephone T at the same time that it is being recorded on P.

The shutter may be attached to the center of the diaphragm, or at the end of a light lever, as in Fig. 21, pivoted in a bar or support *b*. The diaphragm being connected to the short arm of the lever *a* greatly increased motion of the shutter is obtained.

Instead of a shutter cutting off transverse light rays, we may use a plane mirror attached to the center of the diaphragm, and place the light in front but a little to one side, as shown in Fig. 12; the light beam will be reflected to the other side of the center. Now when the diaphragm vibrates the spot of light will also change its position, and the amplitude of its vibrations will be greatly increased by the angle between the light and the central line or axis of the mirror. A uniform pencil of light being thus vibrated on the sensitive surface will produce a sinuous record line as shown in Fig. 6. It will be observed that the sinuous record line produced by the vibrations of the spot of light whether by means of the mirror or of the shutter shown in Fig. 5 will be of uniform character at all points and will not vary in width or breadth but will merely vary in lateral position.

In Fig. 12, the parts marked O and O′ are mouthpieces through which vocal or other sounds are thrown on the diaphragm *d*.

The messages sent by the apparatus described can be received by a telephone and spoken, printed, embossed, repeated, sent on or otherwise disposed of.

It will be observed that according to the present invention the speaking diaphragm is not called upon to do the physical work of actually making the record on the receiving body or surface. The record is made by a transmitted medium and the diaphragm merely controls the point of incidence. In other words, a pencil of light is projected on the record surface and the diaphragm has nothing to do save to vibrate it in accordance with sound waves.

It will be understood that the invention is not confined to the particular structural features shown and that it is adapted for various uses.

Having thus described the invention what is claimed is:

1. In a device for producing sound records, the combination with a speaking diaphragm, of a photo-sensitive surface, means for moving said surface, means including a shutter for cutting off light from said surface except through a single light opening, and means operated by said diaphragm for vibrating said shutter and said light opening in accordance with sound waves.

2. In a device for making sound records the combination with a photo-sensitive surface, of means for moving said surface, means including a movable shutter so constructed as to permit a single spot of light to reach said surface, and means for vibrating said shutter in accordance with sound pulsations whereby said spot will vibrate on said surface.

3. In a device for making sound records the combination with a photo-sensitive surface, of means for moving said surface, means including a movable shutter having a light opening therein for permitting a single spot of light to reach said surface, and means for vibrating said shutter and spot transversely of the line of motion of said surface by and in accordance with sound pulsations.

4. Means for recording sound waves comprising a movable sensitized surface, means for moving said surface, an inclosure therefor provided with an opening, a shutter provided with a light opening and located in front of the opening in said inclosure, a receiving diaphragm, and devices intermediate of said diaphragm and shutter whereby the latter is operated in accordance with the vibrations of the diaphragm.

5. Means for recording sound waves comprising a movable sensitized surface, means for moving said surface, an inclosure therefor provided with an elongated light opening for admitting light to said surface, a shutter extending across said opening and provided with an elongated light opening extending across said first-mentioned opening, and means for moving said shutter longitudinally of said first-mentioned opening in accordance with sound pulsations.

In testimony whereof I affix my signature in presence of two witnesses.

JOSEPHINE H. FRITTS,
*Administratrix of the estate of Charles Edgar Fritts, deceased.*

Witnesses:
GEORGE L. GIBBS,
FRANCES E. FRITTS.